Oct. 7, 1947.  H. E. LE JEUNE  2,428,522
MACHINE FOR CUTTING CORN FROM EARS OF CORN
Filed Sept. 8, 1944   3 Sheets-Sheet 1

H. E. LeJeune
INVENTOR.

BY
ATTORNEYS.

Oct. 7, 1947.  H. E. LE JEUNE  2,428,522
MACHINE FOR CUTTING CORN FROM EARS OF CORN
Filed Sept. 8, 1944  3 Sheets-Sheet 2
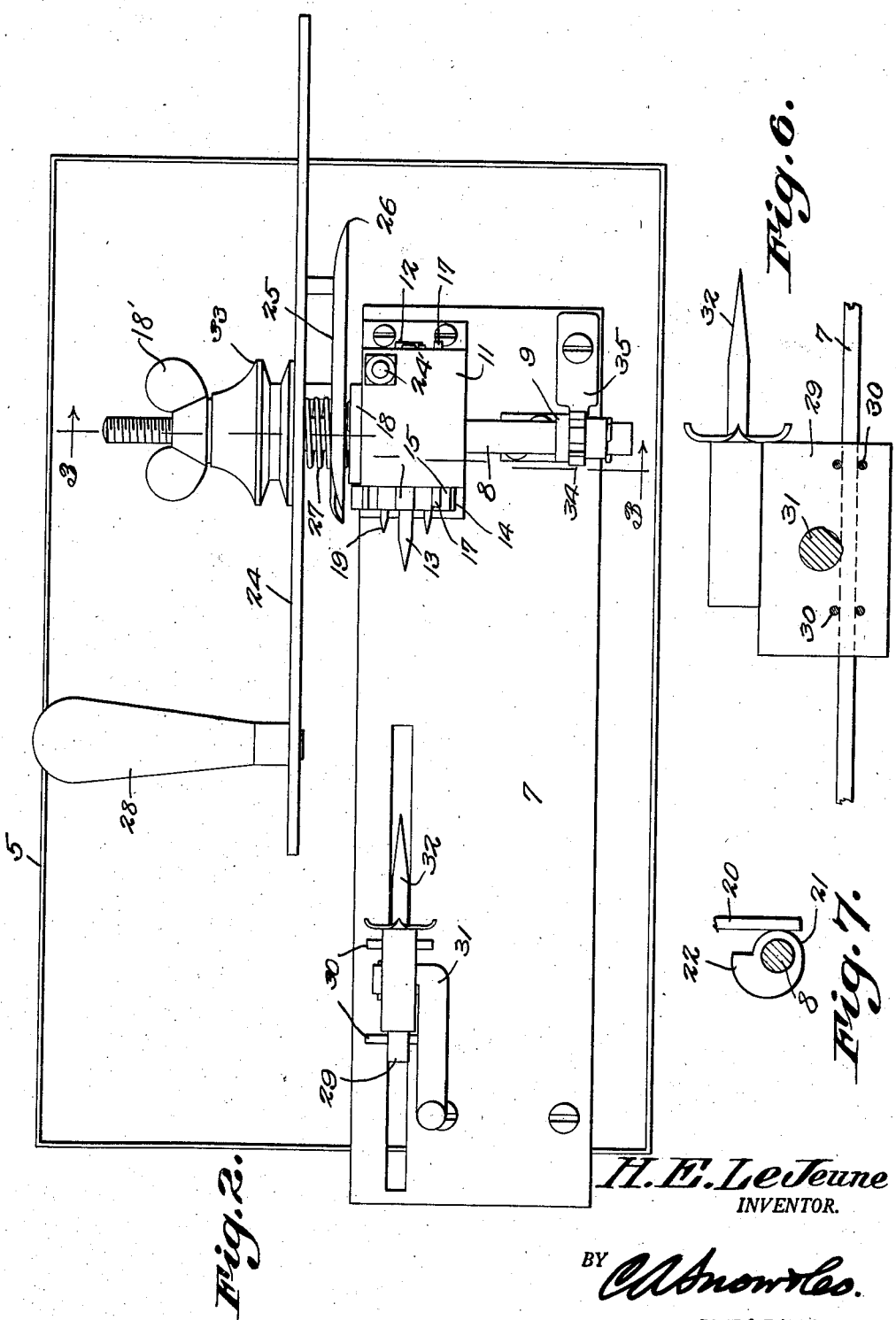

Oct. 7, 1947.　　　H. E. LE JEUNE　　　2,428,522
MACHINE FOR CUTTING CORN FROM EARS OF CORN
Filed Sept. 8, 1944　　　3 Sheets-Sheet 3
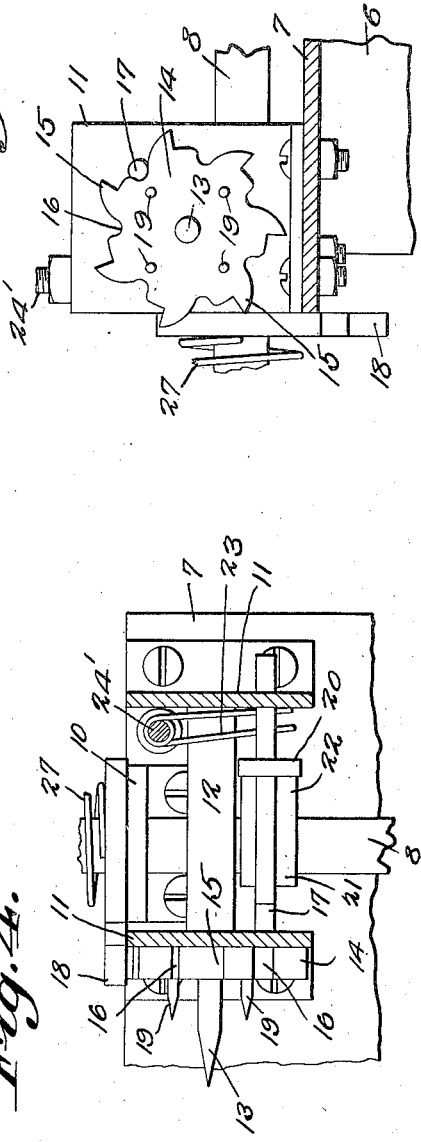
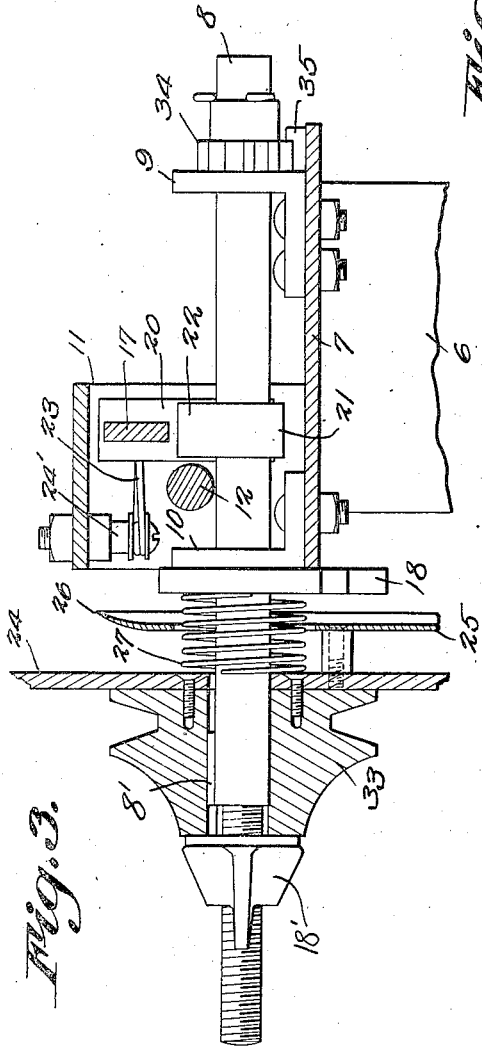
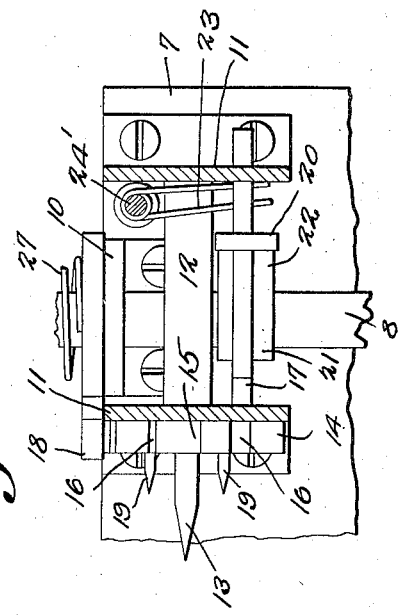
H. E. Le Jeune
INVENTOR.
BY Knowles.
ATTORNEYS Patented Oct. 7, 1947

2,428,522

UNITED STATES PATENT OFFICE 2,428,522

MACHINE FOR CUTTING CORN FROM EARS OF CORN

Henry Ernest Le Jeune, Thibodaux, La.

Application September 8, 1944, Serial No. 553,235

4 Claims. (Cl. 146—4)

This invention relates to a machine for cutting the kernels from ears of corn, preparatory to canning the corn.

An important object of the invention is to provide a machine of this character especially designed for home canning to facilitate the cutting of the corn kernels from ears of corn, eliminating the danger of the person cutting his hands with the knife, which is usually moved longitudinally of the ear of corn, during the cutting operation.

It is a further object of the invention to provide a machine which will appreciably speed up the operation of cutting the corn kernels from ears of corn, the machine being designed to accurately cut the corn close to the cob, reducing waste to a minimum.

With the foregoing and other objects in view which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

Referring to the drawings:

Figure 2 is a plan view thereof.

Figure 3 is a sectional view taken on line 3—3, Figure 2.

Figure 4 is a sectional view taken on line 4—4, of Figure 1.

Figure 5 is an elevational view of supporting means for the ear of corn being cut.

Figure 6 is an elevational view of the means for supporting one end of the ear of corn under treatment.

Figure 7 is a detail view of the cam operating the sliding pin.

Figure 1:
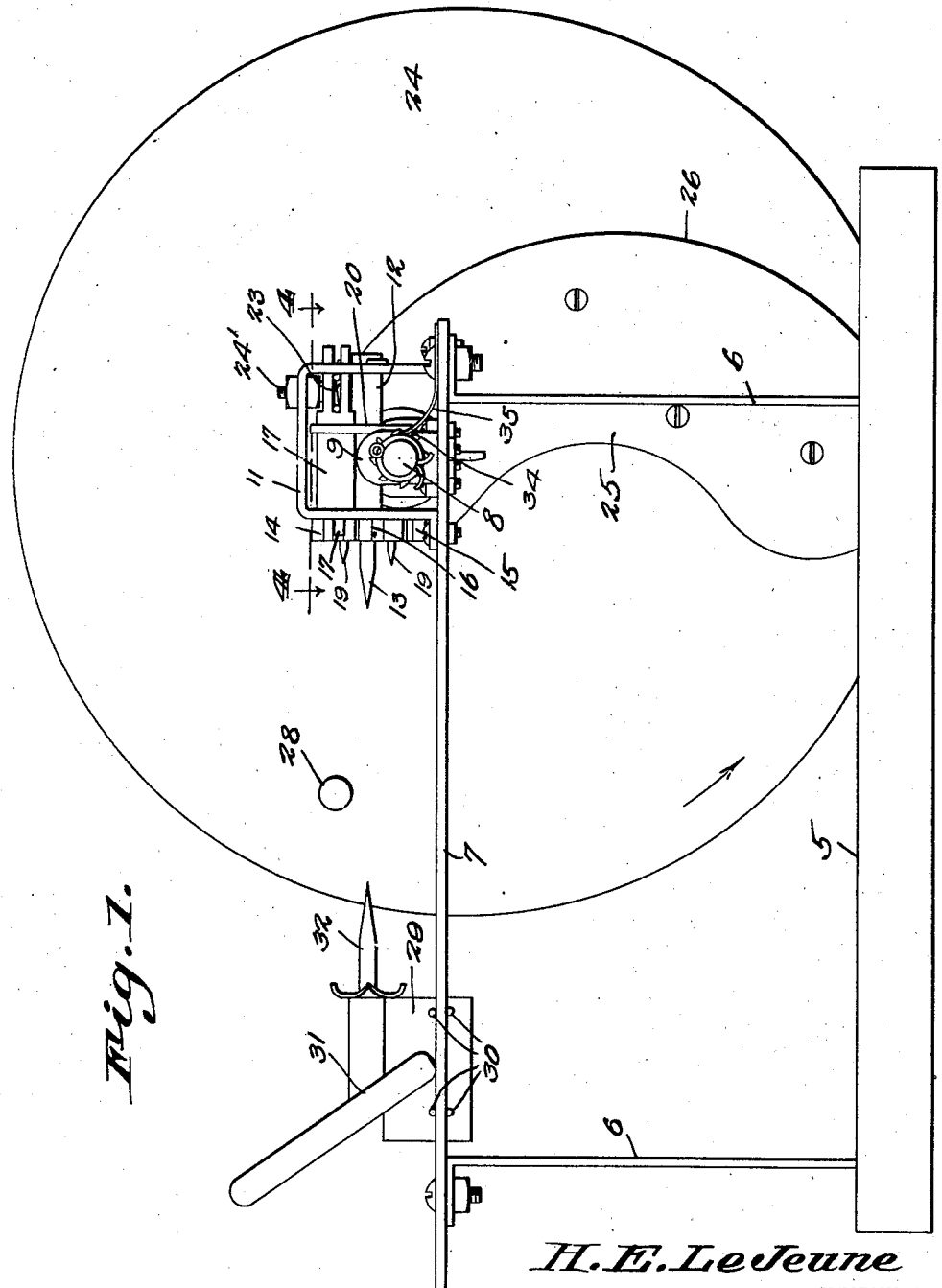
Figure 1 is a side elevational view of a corn cutting machine, constructed in accordance with the invention.

Referring to the drawings in detail, the reference character 5 indicates the base of the machine, which is in the form of a pan into which the corn kernels cut from the ear of corn held in the machine fall.

The frame which supports the rotary cutting blade of the machine, is secured within the base and comprises standards 6, which arise therefrom. The upper ends of the standards 6 are connected by means of the wide plate 7 on which the bearings for the shaft of the cutting blade are supported.

The reference character 8 indicates the shaft on which the rotary blade of the machine is mounted, the shaft being supported in bearings 9 and 10 that are secured to the plate 7, at one end thereof.

Mounted on the plate 7, above the shaft 8, is an inverted U-shaped member 11 which is formed with bearing openings for the shaft 12, which has its forward end tapered, providing a prong 13 adapted to extend into one end of an ear of corn. Secured to the shaft 12 at a point exteriorly of the member 11, is a disk 14 which is provided with teeth 15 spaced appreciable distances apart, between the teeth 15 are recesses 16 for the reception of the sliding pin 17 that moves through openings in the member 11. This sliding pin 17 acts to hold the disk and shaft 12 against movement, for a predetermined period of time. Operating at right angles to the disk 14, and secured to the shaft 8, is a finger 18 which is adapted to contact with the teeth 15 as the shaft 8 rotates, moving the disk periodically the distance between adjacent teeth of the disk. As shown, a tooth of the disk 14 is always in the path of travel of the finger 18 as the finger rotates, to cause this rotary movement of the disk.

Spurs 19 are also extended from the disk 14, and are also designed to be forced into one end of the ear of corn being supported by the machine, so that the ear of corn will be rotated with the disk. Secured to the sliding pin 17, and extended downwardly therefrom, is an arm 20 that normally rests against the collar 21 which is formed with a cam surface 22, so that as the shaft 8 rotates, the cam surface will move the arm 20, with the result that the sliding pin will be retracted from the recess of the disk 14, releasing the disk for rotary movement. One end of the sliding pin is slotted and accommodates the spring 23 that is secured within the member 11 by means of a bolt 24'. This spring acts to normally urge the sliding pin toward the disk 14, with the result that the movement of the pin by the cam surface 22 of the collar 21, acts against the spring. It will, of course, be understood that the collar 21 is so positioned with respect to the finger 18 that the sliding pin will be moved to release the disk, just prior to the contact of the finger 18, with the tooth of the disk lying in the path of travel of the finger 18.

Mounted on the end of shaft 8 is a blade supporting disk 24 to which the blade 25 is secured, the blade having an opening adjacent to its inner end, through which the shaft 8 extends. As shown by Figure 1 of the drawings, the blade 25 is of a construction so that as the blade rotates it will cut throughout the length of an ear of corn supported by the machine, eliminating the necessity of providing mechanical means for moving the blade longitudinally of the ear of corn being cut. Due to the construction of the blade it will be seen that the blade takes a sweeping action along the ear of corn, the cutting edge of the blade being indicated by the reference character 26. The blade supporting disk 24 is mounted eccentrically on the shaft 8, to the end that the normal inactive position of the cutting blade will be such that after an ear of corn has been positioned in the machine, the cutting blade will contact the kernels at one end of the ear of corn and sweep across the ear of corn, cutting a row of kernels longitudinally of the ear of corn.

The disk 24 is secured to the shaft 8 by means of the key 8', so that the disk may move longitudinally of the shaft 8. Disposed between the disk 24 and the finger 18 is the coiled spring 27, which acts to separate the disk 24 and finger 18. Secured to the outer threaded end of the shaft 8 is the wing nut 18', which acts to restrict outward movement of the disk 24 on the shaft 8, and at the same time provides means for tensioning the spring 27. Thus it will be seen that due to this construction the cutting of the corn from the cobs may be regulated.

The operating handle by means of which the blade supporting disk 24 is operated extends from the disk and is indicated by the reference character 28, the handle being eccentrically mounted on the disk.

The plate 7 is formed with an elongated opening in which the member 29 operates, the member 29 being provided with pairs of pins 30 that extend therethrough above and below the plate 7, holding the member 29 in position for true longitudinal movement with respect to the plate 7. An opening is formed in the member 29 and receives the lower right angled end of the securing member 31, which is formed with a flat portion to provide a clearance between the securing member and plate, so that the member 29 will be moved longitudinally of the plate 7. When securing member 31 is moved to the position shown by Figure 6 of the drawings, a binding action is set up between the member 31 and upper plate, securing the member 31 in various positions of adjustment along the slot.

A pin indicated at 32 extends from the member 29, and is adapted to be extended into one end of the ear of corn to be cut, the pin 31 cooperating with the prongs 13 and 19, in supporting the ear of corn.

A pulley indicated at 33 is secured to the disk 24, so that the device may be power-operated through the medium of a power belt operating over the pulley.

In operating the machine an ear of corn is positioned on the prong 13 and the pin 32 is extended into the outer end of the ear of corn, firmly supporting the ear of corn on the machine.

The operating handle is now operated to rotate the disk and cutting blade. The cutting blade will cut the kernels from the ear of corn longitudinally of the ear of corn, and the construction of the blade is such that when the blade has moved throughout the length of the ear of corn, the pin 17 will be operated to release the disk 14. The finger 18 now contacts one of the pins of the disk 14, rotating the disk a distance equal to the distance between adjacent teeth of the disk. This will, of course, rotate the ear of corn supported on the device, bringing the kernels before the cutting blade to be cut from the ear of corn upon the further rotation of the disk. This operation is, of course, repeated until the kernels have been entirely removed from the ear of corn.

It might be further stated that reverse movement of the shaft 8 is prevented by means of the spring arm 35 mounted on plate 7, the arm engaging the ratchet wheel 34 secured to the shaft 8.

What is claimed is:

1. A machine for cutting corn from the cob, comprising a frame, a rotary member for supporting an ear of corn on the frame, a horizontal shaft mounted on the frame, a disc splined on the shaft, means for restricting outward movement of the disk on the shaft, an elongated curved cutting blade secured to the disc and adapted to cut corn from the cob, supported on the frame, a finger secured to the shaft, a yieldable member disposed on the shaft between the disc and finger in frictional engagement with the disc and finger yieldably securing the disc to the shaft, means controlled by the operation of the shaft for periodically rotating the rotary corn supporting member a predetermined distance with each rotation of the blade, and means for holding the corn supporting member against movement during the cutting operation.

2. A machine for cutting corn from its cob, comprising a frame, a shaft extending transversely of the frame, a disc splined on the shaft, a coil spring mounted on the shaft and bearing against the disc, means for restricting outward movement of the disc on the shaft, a finger secured to the shaft and against which one end of the spring engages, means for compressing the spring between the disc and finger yieldably securing the disc to the shaft, an elongated curved blade secured on the disc, rotary means for supporting an ear of corn on the frame in the path of travel of the blade, said finger means being controlled by the rotation of the shaft for rotating said corn supporting means at intervals, and means for securing the rotary arm supporting means against rotation during each cutting operation.

3. A machine for cutting corn from its cob, comprising a frame, an operating shaft mounted on the frame, a rotary corn supporting member having spaced radial teeth mounted on the frame, a finger secured to the shaft, a rotary blade support splined on the shaft, an elongated blade secured to the blade support, a coiled spring disposed between the blade support and finger yieldably securing the blade to the shaft, means for restricting outward movement of the blade support on the shaft, and said finger adapted to engage the teeth of the ear of corn supporting member, rotating the ear of corn after each cutting operation.

4. A machine for cutting corn from the cob, comprising a frame, a shaft mounted on the frame, a rotary corn support mounted on the frame and adapted to extend into one end of an ear of corn, securing the ear of corn to the support, said support having recesses, a corn cutting blade secured to the shaft, means for yieldably connecting the blade to the shaft, a sliding pin controlled by the operation of the shaft and adapted to extend into the recesses and hold the corn cob support against movement during the corn cutting operation, means for releasing said pin after each operation of the blade, and means controlled by the action of the shaft for rotating the support for the ear of corn, whereby rows of the corn are moved into the path of travel of the rotary blade.

HENRY ERNEST LE JEUNE.

REFERENCES CITED

The following references are of record in the file of this patent:

UNITED STATES PATENTS

| Number | Name | Date |
|---|---|---|
| 2,118,119 | Spang | May 24, 1938 |
| 233,472 | Burrell et al. | Oct. 19, 1880 |
| 2,188,934 | Wheeler | Feb. 6, 1940 |
| 10,880 | Dean | Nov. 8, 1887 |
| 343,587 | Koch et al. | June 15, 1886 |
| 230,111 | Cunningham | July 20, 1880 |